US012078146B2

(12) United States Patent
de Souza et al.

(10) Patent No.: US 12,078,146 B2
(45) Date of Patent: Sep. 3, 2024

(54) OFFSHORE WIND TURBINES AND METHODS FOR DEPLOYING AND INSTALLING SAME

(71) Applicant: HORTON DO BRASIL TECNOLOGIA OFFSHORE, LTDA., Rio de Janeiro (BR)

(72) Inventors: Marcelo Igor Lourenço de Souza, Rio de Janeiro (BR); Xavier Castello, Rio Grande (BR); Luiz Germano Bodanese, Rio de Janeiro (BR); Rafael Louzada Bodanese, Rio de Janeiro (BR)

(73) Assignee: HORTON DO BRASIL TECNOLOGIA OFFSHORE, LTDA., Rio de Janeiro (BR)

( * ) Notice: Subject to any disclaimer, the term of this patent is extended or adjusted under 35 U.S.C. 154(b) by 982 days.

(21) Appl. No.: 17/050,782

(22) PCT Filed: Apr. 26, 2019

(86) PCT No.: PCT/BR2019/050153
§ 371 (c)(1),
(2) Date: Oct. 26, 2020

(87) PCT Pub. No.: WO2019/204895
PCT Pub. Date: Oct. 31, 2019

(65) Prior Publication Data
US 2021/0231105 A1 Jul. 29, 2021

Related U.S. Application Data

(60) Provisional application No. 62/663,469, filed on Apr. 27, 2018.

(51) Int. Cl.
*F03D 13/10* (2016.01)
*B63B 35/44* (2006.01)
(Continued)

(52) U.S. Cl.
CPC .............. *F03D 13/10* (2016.05); *B63B 35/44* (2013.01); *F03D 9/34* (2016.05); *F03D 13/25* (2016.05);
(Continued)

(58) Field of Classification Search
CPC . F03D 13/10; F03D 9/34; F03D 13/25; F03D 13/40; B63B 35/44; B63B 2035/446; F05B 2240/9151; F05B 2240/97
(Continued)

(56) References Cited

U.S. PATENT DOCUMENTS

2004/0169376 A1* 9/2004 Ruer ..................... E02D 27/425
290/55
2007/0243063 A1* 10/2007 Schellstede ............. E02D 27/42
416/10
(Continued)

FOREIGN PATENT DOCUMENTS

DE  4029932 A1 * 3/1992 ........... E04H 12/182
GB  2365905 A  * 2/2002 ........... E02B 17/027
(Continued)

OTHER PUBLICATIONS

European Search Report dated Nov. 9, 2021 for European Application No. 19792204.0 (4 p.).
(Continued)

*Primary Examiner* — Hung Q Nguyen
*Assistant Examiner* — Anthony Donald Taylor, Jr.
(74) *Attorney, Agent, or Firm* — CONLEY ROSE, P.C.

(57) ABSTRACT

An offshore wind turbine includes a ballast adjustable hull. In addition, the offshore wind turbine includes a telescopic tower movably coupled to the hull. The tower has a central axis and comprises a plurality of nested concentrically arranged elongate tubulars. Further, the offshore wind turbine includes a ballast adjustable elevator disposed about the
(Continued)

telescopic tower and movably coupled to the hull. The elevator is configured to lift one or more of the plurality of tubulars of the tower axially upward relative to the hull. Still further, the offshore wind turbine includes a nacelle coupled to an upper end of one of the plurality of tubulars of the tower. Moreover, the offshore wind turbine includes a rotor assembly coupled to the nacelle.

21 Claims, 12 Drawing Sheets

(51) Int. Cl.
    *F03D 9/34*       (2016.01)
    *F03D 13/25*     (2016.01)
    *F03D 13/40*     (2016.01)

(52) U.S. Cl.
    CPC ........ *F03D 13/40* (2016.05); *B63B 2035/446* (2013.01); *F05B 2240/9151* (2013.01); *F05B 2240/97* (2013.01)

(58) Field of Classification Search
    USPC ..................................................... 416/244 R
    See application file for complete search history.

(56) References Cited

U.S. PATENT DOCUMENTS

| | | | | |
|---|---|---|---|---|
| 2010/0150665 A1* | 6/2010 | Karal | ...................... | B63B 77/10 405/231 |
| 2011/0148115 A1* | 6/2011 | Roznitsky | ............... | F03D 13/10 290/55 |
| 2012/0045345 A1* | 2/2012 | Horton, III | ........... | E02B 17/027 29/889 |
| 2012/0057979 A1* | 3/2012 | Schellstede | ............. | F03D 13/20 416/169 R |
| 2013/0117998 A1* | 5/2013 | Merryman | ............ | E04H 12/182 29/592 |
| 2014/0064856 A1* | 3/2014 | Westergaard | ....... | E02B 17/0004 114/72 |
| 2014/0311085 A1* | 10/2014 | Fernandez Gomez | . | F03D 13/25 52/745.18 |
| 2015/0240442 A1* | 8/2015 | Garcia-Valdecasas Bernal | .......... | E02D 27/22 405/208 |
| 2015/0354164 A1* | 12/2015 | Kok Seng | ............. | E02D 27/525 405/224 |
| 2017/0197690 A1* | 7/2017 | Nakamura | ............ | B63B 35/003 |
| 2018/0030961 A1* | 2/2018 | Bodanese | ............... | F03D 13/40 |
| 2018/0030962 A1* | 2/2018 | Bodanese | ............... | F03D 13/10 |
| 2018/0148140 A1* | 5/2018 | Fernandez Gomez | ..................... | B63B 35/44 |

FOREIGN PATENT DOCUMENTS

| | | | |
|---|---|---|---|
| WO | WO2012046077 A1 * | 4/2012 | ............ F03D 13/10 |
| WO | 2015/181424 A1 | 12/2015 | |

OTHER PUBLICATIONS

PCT/BR2019/050153 International Search Report and Written Opinion dated Nov. 12, 2019 (17 p.).
European Examination Report dated Nov. 30, 2021 for European Application No. 19792204.0 (5 p.).

* cited by examiner

OFFSHORE WIND TURBINES AND METHODS FOR DEPLOYING AND INSTALLING SAME

CROSS-REFERENCE TO RELATED APPLICATIONS

This application is a 35 U.S.C. § 371 national stage application of PCT/BR2019/050153 filed Apr. 26, 2019, entitled "Offshore Wind Turbines and Methods for Deploying and Installing Same," which claims benefit of U.S. provisional patent application Ser. No. 62/663,469 filed Apr. 27, 2018, and entitled "Offshore Wind Turbines and Methods for Deploying and Installing Same," each of which is hereby incorporated herein by reference in its entirety for all purposes.

STATEMENT REGARDING FEDERALLY SPONSORED RESEARCH OR DEVELOPMENT

Not applicable.

BACKGROUND

The disclosure relates generally to offshore wind turbines, and methods for deploying and installing same. More particularly, the disclosure relates to offshore wind turbines including adjustably buoyant hulls and telescopic towers.

Wind turbines convert the kinetic energy of wind into mechanical power used to drive a generator that produces electricity. The produced electricity may be used locally (e.g., proximal the wind turbine) and/or provided to an electricity grid for further distribution and use. The deployment and installation of wind turbines at offshore locations has gained popularity due to the relatively higher wind speeds and reduced number of obstructions.

BRIEF SUMMARY OF THE DISCLOSURE

Embodiments of offshore wind turbines are disclosed herein. In an embodiment, an offshore wind turbine comprises a ballast adjustable hull. In addition, the offshore wind turbine comprises a telescopic tower movably coupled to the hull. The tower has a central axis and comprises a plurality of nested concentrically arranged elongate tubulars. Further, the offshore wind turbine comprises a ballast adjustable elevator disposed about the telescopic tower and movably coupled to the hull. The elevator is configured to lift one or more of the plurality of tubulars of the tower axially upward relative to the hull. Still further, the offshore wind turbine comprises a nacelle coupled to an upper end of one of the plurality of tubulars of the tower. The offshore wind turbine also comprises a rotor assembly coupled to the nacelle.

Embodiments of methods for deploying and installing an offshore wind turbines are disclosed herein. In an embodiment, a method for deploying and installing an offshore wind turbine comprises (a) transporting an offshore wind turbine to an offshore installation site. The wind turbine includes a ballast adjustable hull, a telescopic tower moveably coupled to the hull and retracted into a receptacle of the hull, an elevator disposed about the telescopic tower and movably coupled to the hull, a nacelle coupled to the tower, and a rotor assembly coupled to the nacelle. In addition, the method comprises (b) floating the wind turbine over a desired installation location at the installation site after (a). Further, the method comprises (c) ballasting the hull to lower the wind turbine after (b). Still further, the method comprises (d) coupling the hull to the sea floor after (c) to hold the wind turbine at the installation site. Moreover, the method comprises (e) erecting the telescopic tower after (c) and (d) by telescopically extending the tower from the receptacle of the hull.

Embodiments of methods for erecting a tower of an offshore wind turbines are disclosed herein. In an embodiment, the tower has a central axis and includes a first tubular, a second tubular movably disposed about the first tubular, and a third tubular movably disposed about the second tubular. The first tubular, the second tubular, and the third tubular are nested and concentrically arranged. The method comprises (a) raising the first tubular axially relative to the second tubular and the third tubular with an elevator disposed about the tower. In addition, the method comprises (b) axially extending the first tubular from the second tubular and the third tubular during (a). Further, the method comprises (c) locking the axial position of the first tubular relative to the second tubular after (b). Still further, the method comprises (d) lowering the elevator relative to the first tubular, the second tubular, and the third tubular after (c) with the first tubular axially locked relative to the second tubular. Moreover, the method comprises (e) raising the second tubular and the first tubular with the elevator after (d) with the first tubular axially locked relative to the second tubular. The method also comprises (f) axially extending the second tubular from the third tubular during (e). In addition, the method comprises (g) locking the axial position of the first tubular and the second tubular relative to the third tubular after (f). Still further, the method comprises (h) lowering the elevator relative to the first tubular, the second tubular, and the third tubular after (g) with the first tubular and the second tubular axially locked relative to the third tubular.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which.

DETAILED DESCRIPTION OF THE PREFERRED EMBODIMENTS

Figure 1:
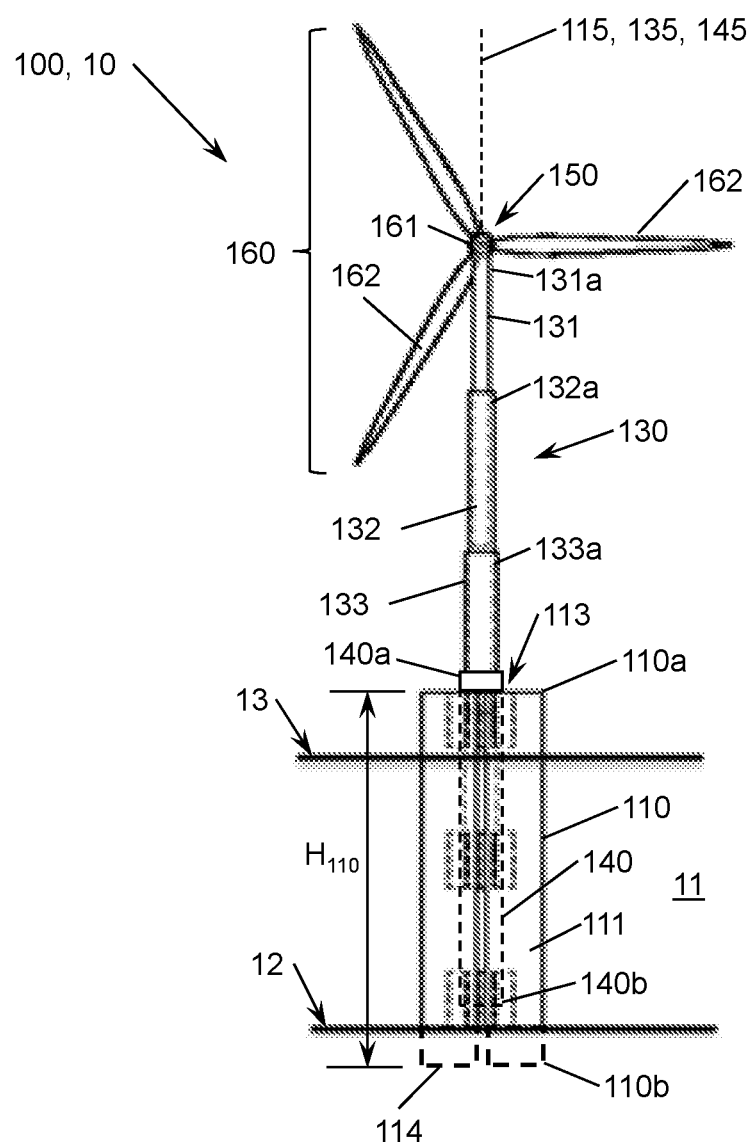
FIG. 1 is a front schematic view of an embodiment of an offshore wind turbine in accordance with the principles described herein.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct engagement between the two devices, or through an indirect connection that is established via other devices, components, nodes, and connections. In addition, as used herein, the terms "axial" and "axially" generally mean along or parallel to a particular axis (e.g., central axis of a body or a port), while the terms "radial" and "radially" generally mean perpendicular to a particular axis. For instance, an axial distance refers to a distance measured along or parallel to the axis, and a radial distance means a distance measured perpendicular to the axis. As used herein, the terms "approximately," "about," "substantially," and the like mean within 10% (i.e., plus or minus 10%) of the recited value. Thus, for example, a recited angle of "about 80 degrees" refers to an angle ranging from 72 degrees to 88 degrees.

As previously described, the use of offshore wind turbines to produce electricity has generally grown in popularity. However, the deployment and installation of offshore wind turbines can be complex, time consuming, and relatively expensive. For example, many conventional offshore wind turbines are assembled offshore at the installation location. In particular, the nacelle, which houses the generator, and the tower of many conventional offshore wind turbines are deployed separately to the offshore installation location. Next, the tower is installed at the offshore installation site, and then the nacelle is mounted to the upper end of the tower. This process may require multiple transport vessels, as well as a barge mounted crane to lift the nacelle above the tower for mounting thereto. In some cases, the blades are also transported separately and subsequently mounted to the nacelle following installation of the nacelle onto the upper end of the tower.

Figure 2:
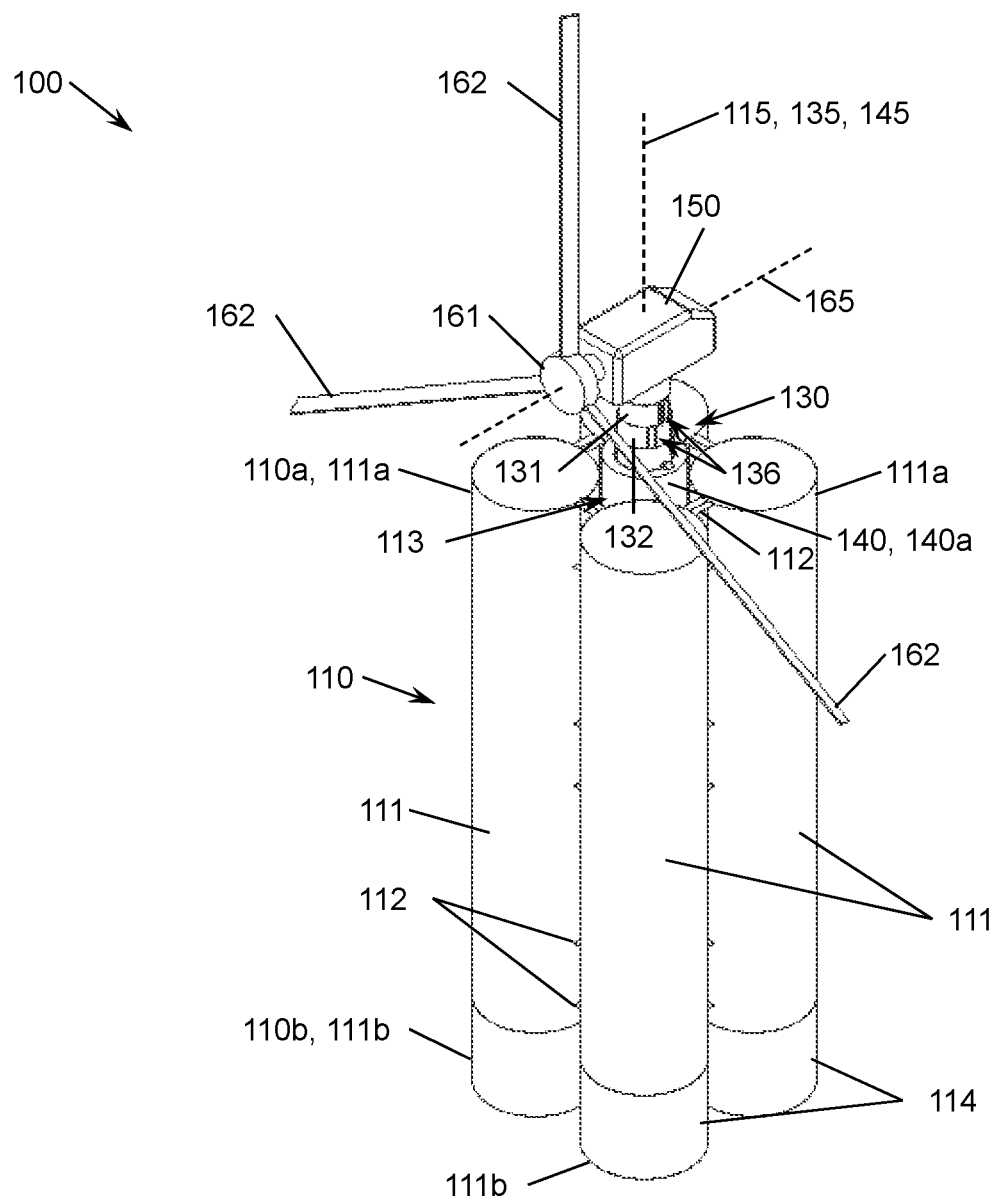
FIG. 2 is a perspective view of the offshore wind turbine of FIG. 1 with the telescopic tower in the retracted position.
Figure 3:
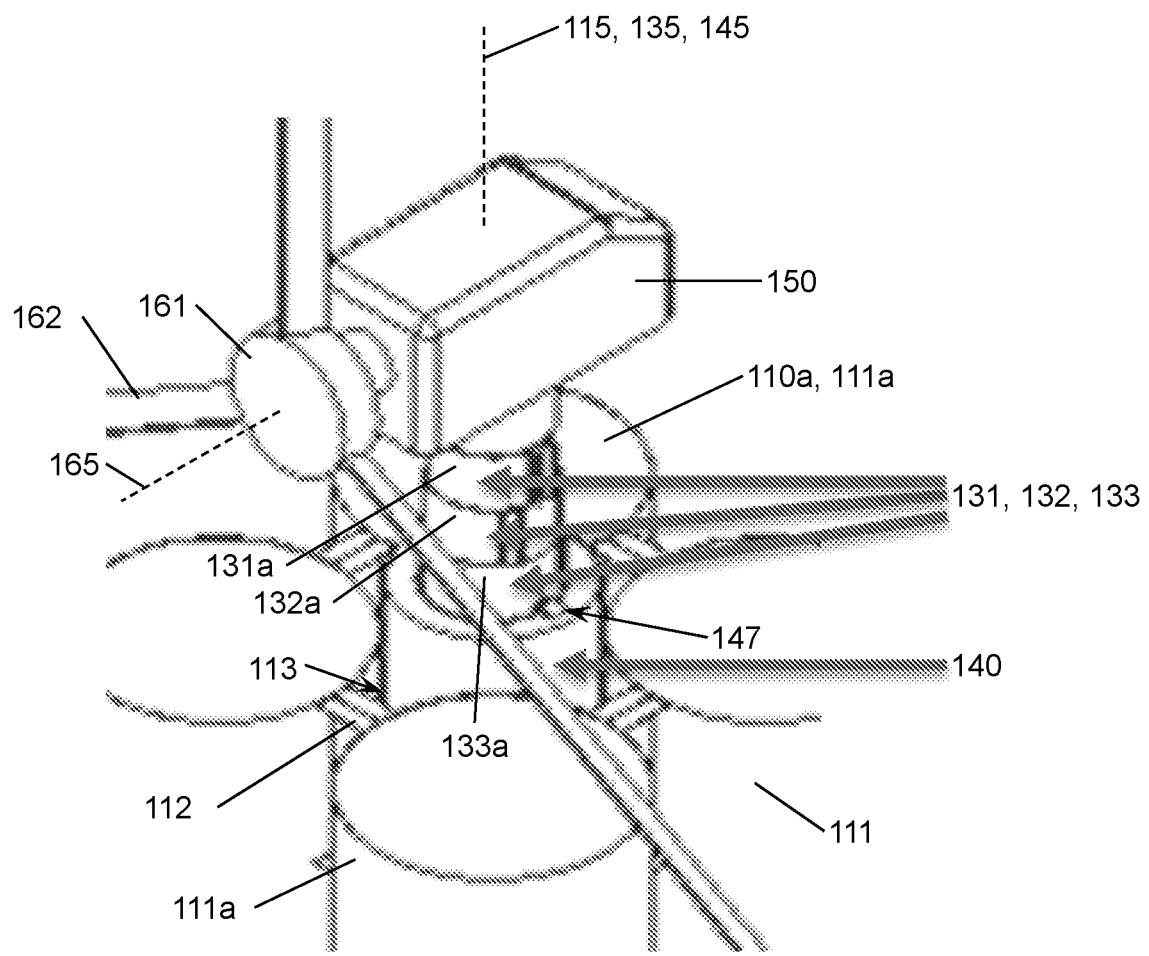
FIG. 3 is an enlarged perspective view of the offshore wind turbine of FIG. 2 illustrating the upper ends of the hull, the elevator, and the telescopic tower.

Referring now to FIG. 1, an embodiment of an offshore wind turbine 100 is shown installed at an installation location or site 10 in a body of water 11. In general, wind turbine 100 converts wind into electrical power. In this embodiment, wind turbine 100 includes a ballast adjustable hull 110, a telescopic tower 130 moveably coupled to hull 110, an elevator 140 movably coupled to hull 110 and tower 130, a nacelle 150 pivotally coupled to the upper end of tower 130, and a rotor assembly 160 coupled to nacelle 150. As will be described in more detail below, elevator 140 functions to erect telescopic tower 130. The various electricity generating components such as the generator, gearbox, drive train, and brake assembly of turbine 100 are disposed within nacelle 150. Rotor assembly 160 includes a central hub 161 and a plurality of uniformly angularly-spaced blades 162 coupled to hub 161. As best shown in FIGS. 2 and 3, rotor assembly 160 has an axis of rotation 165 about which hub 161 and blades 162 extending from hub 161 rotate during power generating activities.

Figure 9:
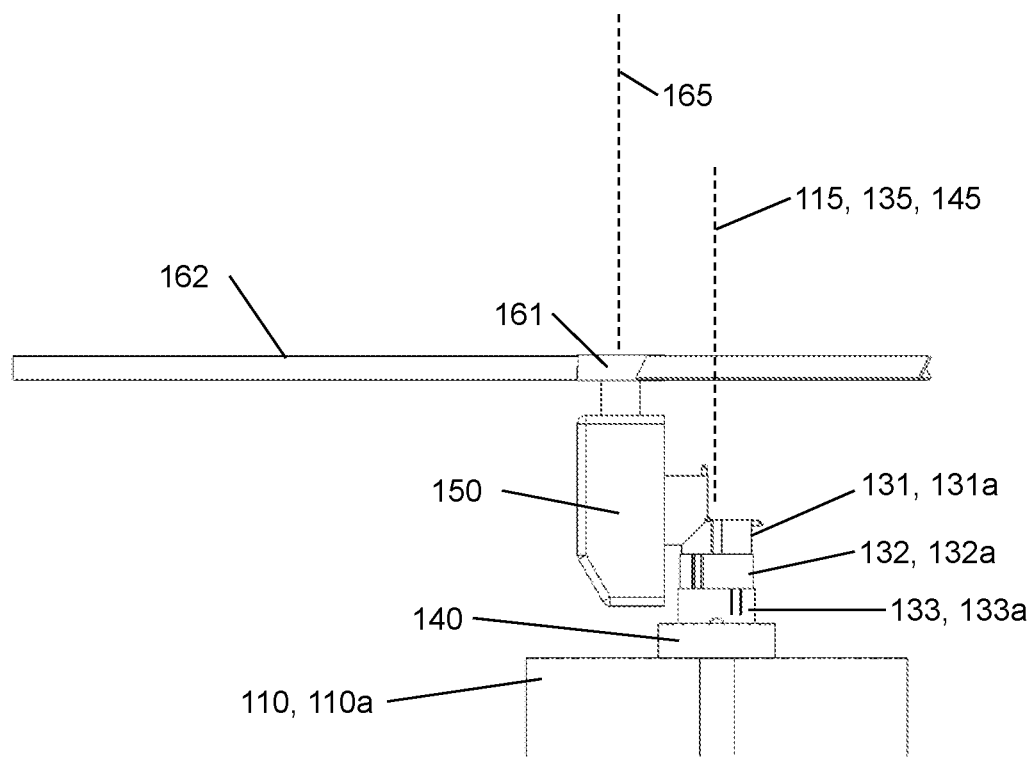
FIG. 9 is a partial enlarged side view of the offshore wind turbine of FIG. 1 arranged for deployment with the telescopic tower in the retracted position and the nacelle in the pivoted position.
Figure 10:
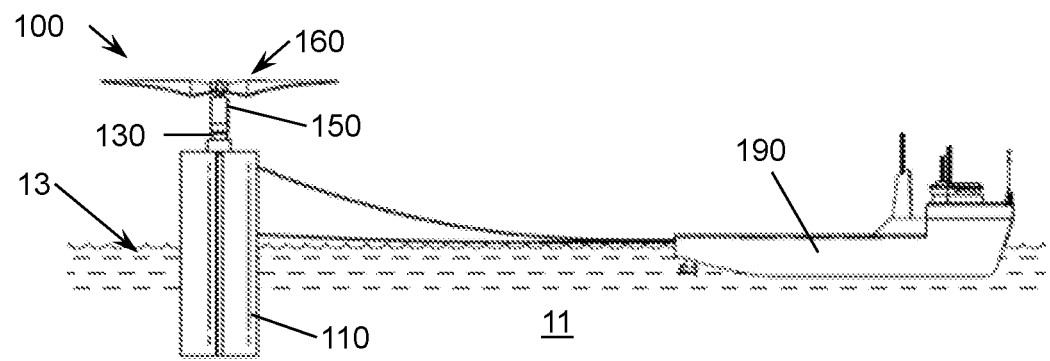
FIG. 10 is a side view of an embodiment of a method for deploying the offshore wind turbine of FIG. 1 to an offshore installation location.
Figure 11:
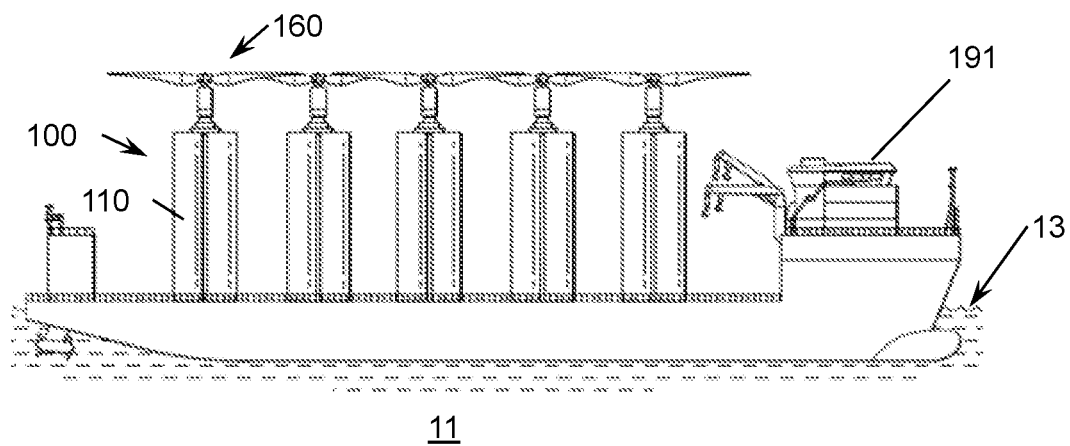
FIG. 11 is a side view of an embodiment of a method for deploying the offshore wind turbine of FIG. 1 to an offshore installation location.
Figure 12:
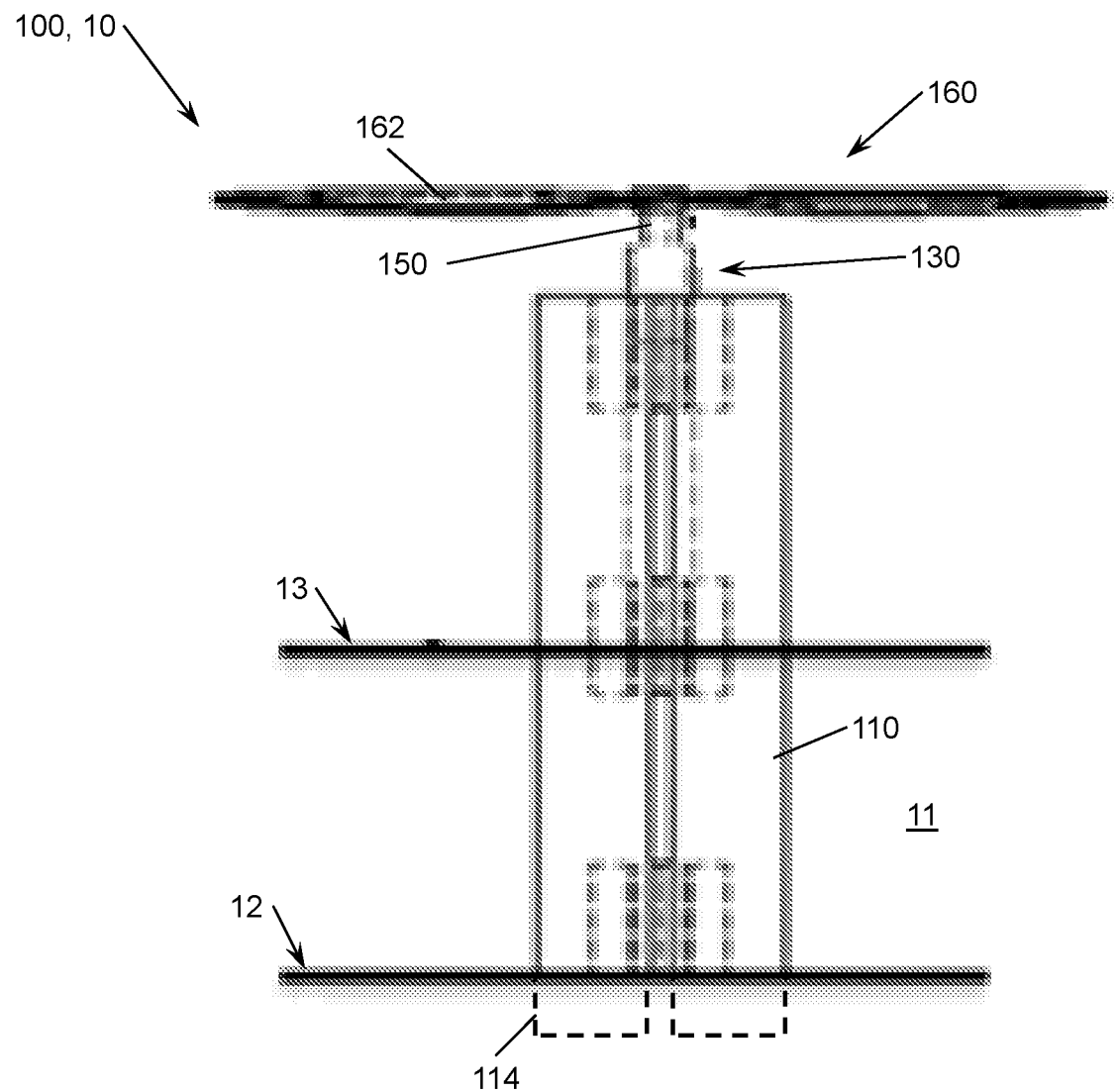
FIG. 12 is a side view of the offshore wind turbine of FIG. 1 being installed at the offshore installation location after being deployed to the offshore installation location.
Figure 13:
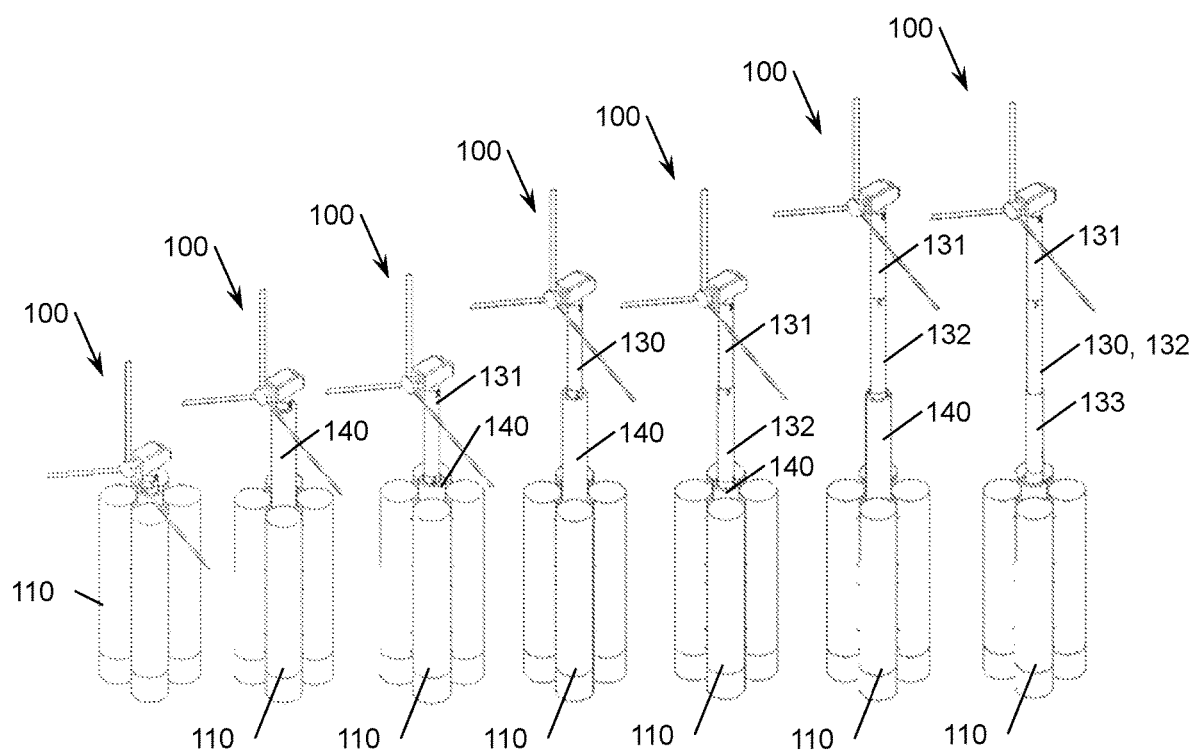
FIG. 13 illustrates sequential perspective views of the offshore wind turbine of FIG. 1 being erected at the offshore installation location.

In FIG. 1, wind turbine 100 is shown in an installed or operational configuration with hull 110 releasably secured to the sea floor 12 at site 10, tower 130 telescopically extended vertically upward from hull 110 to position nacelle 150 and rotor assembly 160 above the sea surface 13, and nacelle 150 pivoted to a horizontal orientation. As will be described in more detail below and as is shown in FIGS. 9 and 10, wind turbine 100 may also be arranged in a transport or deployment configuration during delivery of wind turbine 100 to installation site 10. In the transport configuration, tower 130 is retracted within hull 110 to position nacelle 150 vertically adjacent hull 110 and nacelle 150 is pivoted to a vertical orientation. Accordingly, telescopic tower 130 may be described as having a first position with tower 130 retracted into hull 110 as shown in FIG. 2, and a second positon with tower 130 extended from hull 110 as shown in FIG. 1. Tower 130 is generally disposed in the first or retracted position during transport and deployment of wind turbine 100 as shown in FIGS. 10-12, and then transitioned to the second or extended position during installation of wind turbine 100 at site 10 as shown in FIGS. 12 and 13. Further, in this embodiment, nacelle 150 may be described as having a first position with nacelle 150 and the rotational axis 165 of rotor assembly 160 in a vertical orientation as shown in FIGS. 9-11, and a second position with nacelle 150 and the rotational axis 165 of rotor assembly 160 in a horizontal orientation as shown in FIGS. 1, 2, and 13. Blades 162 are generally disposed in a horizontal plane with nacelle 150 in the first position, and blades 162 are generally disposed in a vertical plane with nacelle 150 in the second position. Nacelle 150 is generally oriented in the first position during transport and deployment of wind turbine 100 as shown in FIGS. 10-12, and then transitioned to the second position during installation of wind turbine 100 at site 10 as shown in FIGS. 12 and 13.

Referring now to FIGS. 1 and 2, hull 110 has a central or longitudinal axis 115, a first or upper end 110*a*, and a second or lower end 110*b*. Hull 110 has a height $H_{110}$ measured axially from lower end 110*b* to upper end 110*a*. In embodiments where hull 110 is seated on the sea floor 12 (e.g., FIG. 1), the height $H_{110}$ is greater than the depth of the water 11 at installation site 10. However, in other embodiments where hull 110 is not seated on the sea floor 12, but rather floats at the installation site 10, the height $H_{110}$ is less than the depth of the water at the installation site (e.g., water 11 at site 10). For most offshore installations, the height $H_{110}$ of hull 110 is between 30 ft. and 300 ft.

As best shown in FIGS. 2 and 3, hull 110 includes a plurality (e.g., at least three) of circumferentially-spaced, parallel vertical columns 111 fixably coupled to each other with a plurality of connection members or braces 112. In particular, a plurality of axially spaced connection members 112 extend horizontally between each pair of circumferentially adjacent columns 111 and has ends fixably attached (e.g., welded) to the two corresponding columns 111. Consequently, columns 111 are fixably coupled together such that they cannot move translationally or rotationally relative to each other. Due to the circumferential spacing of columns 111, an elongate receptacle 113 is provided between and within the columns 111. As will be described in more detail below, telescopic tower 130 and elevator 140 are moveably disposed within receptacle 113. Although four columns 112 are provided in this embodiment of turbine 100, in other embodiments, a different number of pontoons (e.g., three or five columns 111) can be provided.

Referring still to FIGS. 1 and 2, each column 111 has a central or longitudinal axis oriented parallel to axis 115, a first or upper end 111*a* defining upper end 110*a* of hull 110, and a second or lower end 111*b* defining lower end 110*b* of hull 110. As previously described, in this embodiment, hull 110 is directly seated on the sea floor 12. More specifically, hull 110 is releasably secured and anchored to the sea floor 12 such that hull 110, and hence wind turbine 100, are restricted and/or prevented from moving translationally and rotationally relative to the sea floor 12 once installed. In this embodiment, lower end 111*b* of each column 111 comprises an axially extending annular skirt 114 that functions as a suction skirt or pile to secure hull 110 to the sea floor 12. In addition, each column 111 includes a plurality of vertically stacked chambers or tanks defined by a plurality of vertically spaced bulkheads. One or more chambers at the lower end 111*b* of each column 111 include fixed ballast, and one or more chambers between ends 111*a*, 111*b* of each column 111 are variable ballast chambers that can be selectively and controllably filled with ballast water and/or air to adjust the weight of hull 110 and the buoyant force applied to hull 110. Although hull 110 is directly secured to the sea floor 12 with skirts 114 in this embodiment, as will be described in more detail below with respect to FIG. 13, in other embodiments, the hull (e.g., hull 110) floats above the sea floor and is maintained in position at the installation site with a mooring system extending from the hull to the sea floor.

Referring now to FIGS. 1-3, elevator 140 is at least partially disposed in central receptacle 113 of hull 110 and tower 130 is at least partially disposed within elevator 140. Elevator 140 can move rotationally and axially relative to hull 110, and tower 130 can extend telescopically upward from elevator 140 and hull 110. In this embodiment, a plurality of contact pads (not visible) are provided between elevator 140 and columns 111. In particular, an elongate vertically oriented pad is provided between each column 111 and elevator 140. In this embodiment, the pads are fixably attached to the columns 111 and the elevator 140 slidingly engages the pads. Thus, the pads allow elevator 140 to move rotationally and axially (vertically) relative to hull 110 while simultaneously restricting and/or preventing elevator 140 from moving laterally and radially relative to hull 110.

Referring now to FIGS. 1-5, tower 130 has a central or longitudinal axis 135 oriented parallel to axis 115 of hull 110. In this embodiment, tower 130 includes a plurality of nested, concentrically arranged cylindrical tubulars 131, 132, 133. Elevator 140 is disposed about tubulars 131, 132, 133.

Figure 4:
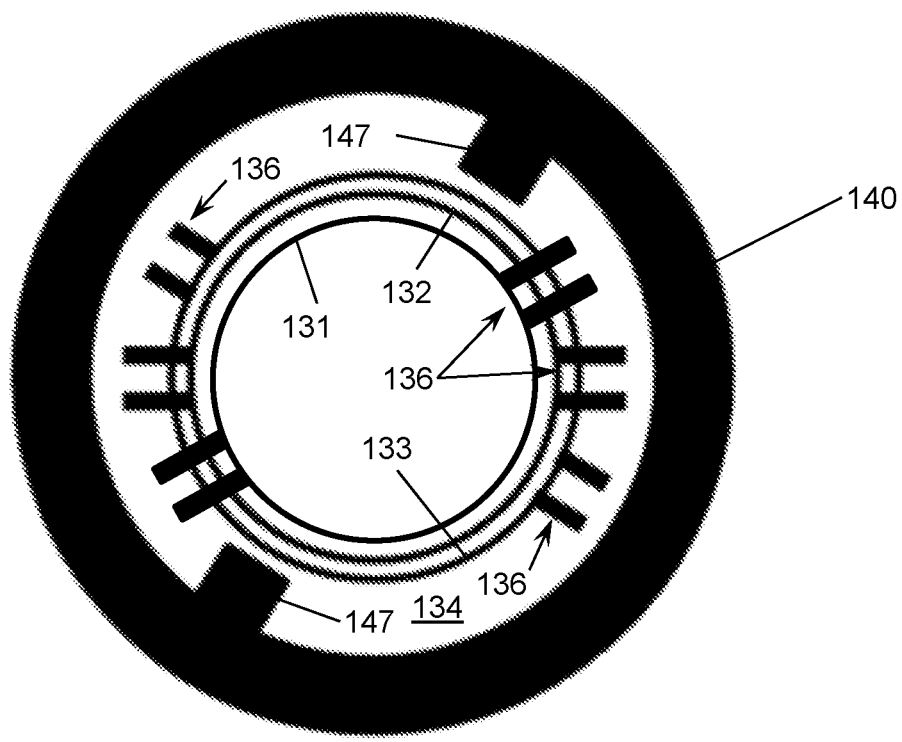
FIG. 4 is a schematic top view of the elevator and the telescopic tower of FIG. 2.
Figure 5:
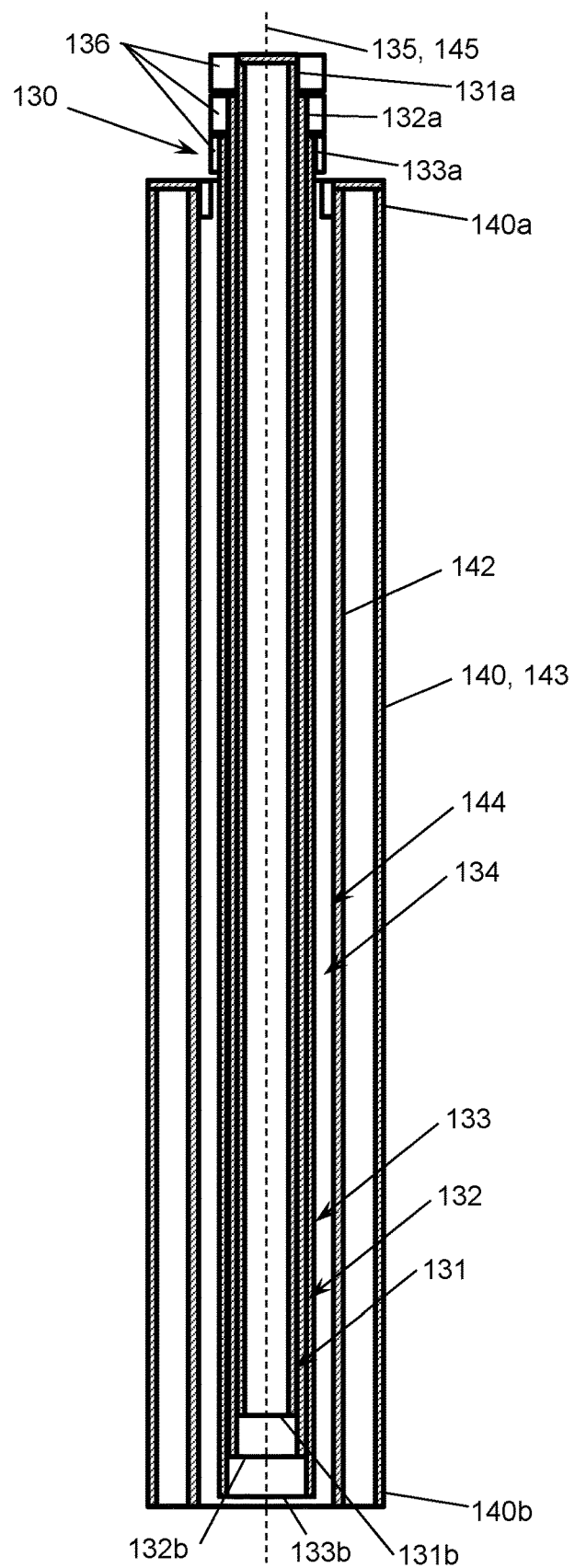
FIG. 5 is a schematic cross-sectional side view of the elevator and the telescopic tower of FIG. 4.

In this embodiment, tower 130 includes three tubulars 131, 132, 133. Tubular 131 is moveably disposed within tubular 132, and tubular 132 is moveably disposed within tubular 133. Thus, tubular 132 is radially positioned between tubulars 131, 133. Accordingly, tubular 131 may be referred to as the first or inner tubular 131, tubular 132 may be referred to as the second or intermediate tubular 132, and tubular 133 may be referred to as the third or outer tubular 133. As best shown in FIGS. 3 and 5, tubulars 131, 132, 133 are sized such that the radially outer cylindrical surface of inner tubular 131 slidingly engages the radially inner cylindrical surface of intermediate tubular 132, and the radially outer cylindrical surface of intermediate tubular 132 slidingly engages the radially inner cylindrical surface of outer tubular 133. In other words, the radially outer surface of inner tubular 131 is disposed at substantially the same radius as the radially inner surface of intermediate tubular 132, and the radially outer surface of intermediate tubular 132 is disposed at substantially the same radius as the radially outer surface of outer tubular 134. However, as best shown in FIGS. 4 and 5, an annular gap or annulus 134 is radially positioned between outer tubular 133 and elevator 140, and thus, elevator 140 does not slidingly engage outer tubular 133. As will be described in more detail below, during installation of wind turbine 100, and more specifically, during erection and extension of tower 130, tubulars 131, 132, 133 move axially relative to each other and elevator 140. Although three tubulars 131, 132, 133 are provided in tower 130 in this embodiment, in other embodiments, the tower (e.g., tower 130) may include any number of tubulars (e.g., tubulars 131, 132, 133) such as, for example, two, four, or more in a nested, concentric, sliding arrangement.

Figure 6:
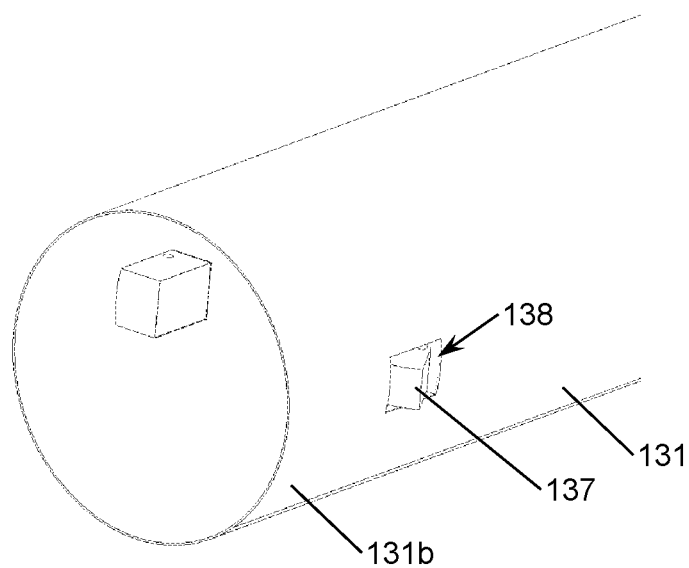
FIG. 6 is a perspective view of the lower end and associated locking members of the inner tubular of the telescopic tower of FIG. 1.
Figure 7:
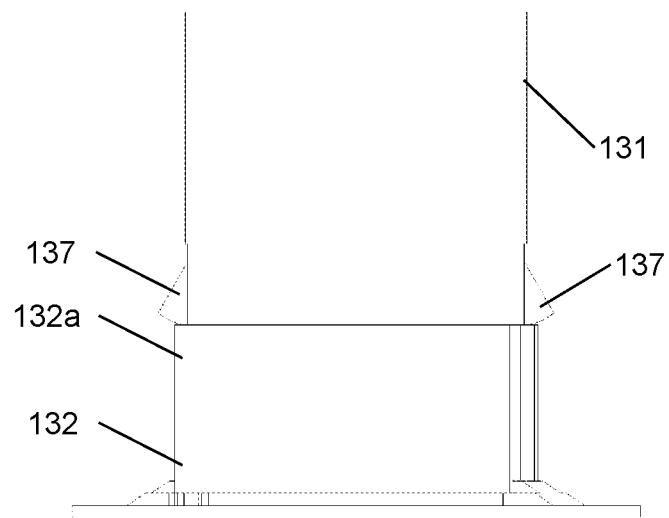
FIG. 7 is an enlarged front view of the lower end of the inner tubular of FIG. 6 with the locking member deployed.

Referring again to FIGS. 1-3 and 5, each tubular 131, 132, 133 has a first or upper end 131*a*, 132*a*, 133*a*, respectively, and a second or lower end 131*b*, 132*b*, 133*b*, respectively. The lower ends 131*b*, 132*b*, 133*b* of tubulars 131, 132, 133, respectively, are disposed within other structures, and thus, are generally not visible in FIGS. 1-3. The exemplary lower end 131*b* of inner tubular 131 is shown in FIGS. 6 and 7, which are described in more detail below. As best shown in FIG. 5, in this embodiment, each tubular 131, 132, 133 is an elongate hollow cylinder extending between upper end 131a, 132a, 133a, respectively, and the corresponding lower end 131b, 132b, 133b, respectively. Upper end 131a of inner tubular 131 is closed and sealed by an end cap or bulkhead, while upper ends 132a, 133a are open to allow inner tubular 131 to extend through upper end 132a of intermediate tubular 132 and to allow intermediate tubular 132 to extend through upper end 133a of outer tubular 133. The lower ends of tubulars 131, 132, 133 are open, and thus, allow water to flow freely into and out of the corresponding tubulars 131, 132, 133 when disposed below the surface 13 of water 11. With lower end 131b of inner tubular 131 open and the upper end 131a of inner tubular 131 closed, inner tubular 131 can be controllably and selectively ballasted by removing air from the inside of inner tubular 131 (e.g., opening a valve proximal upper end 131a to allow air to escape) and allowing water to enter the inside of inner tubular 131 via lower end 131b, and controllably and selectively deballasted by pumping air into the inside of inner tubular 131 and forcing water to exit the inside of inner tubular 131 via lower end 131b.

Figure 8:
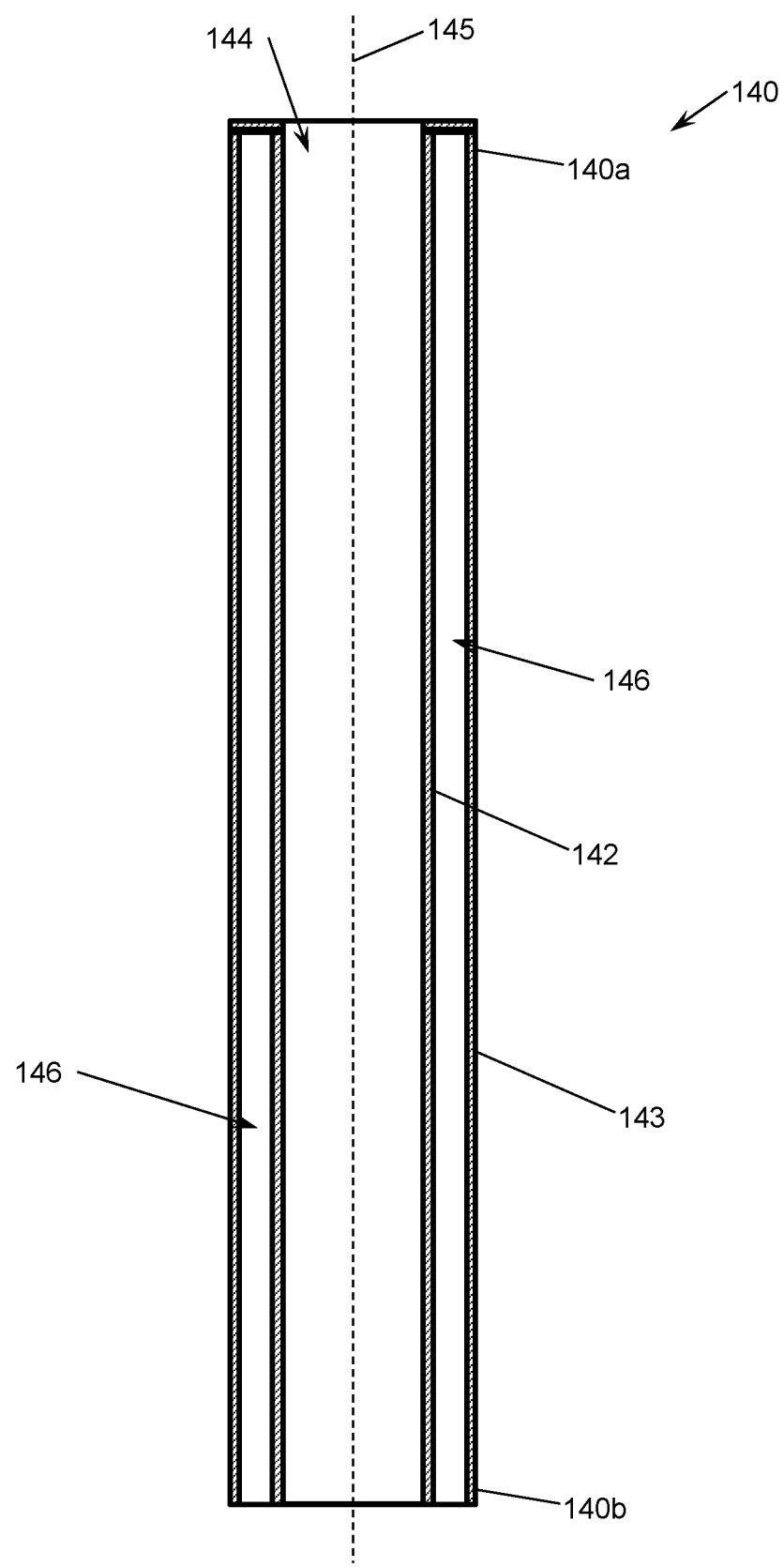
FIG. 8 is a schematic cross-sectional side view of the elevator of FIG. 5.

As best shown in FIGS. 3 and 9, nacelle 150 is pivotally coupled to upper end 131a of inner tubular 131 with a pivot joint 151. Pivot joint 151 defines a horizontal axis of rotation about which nacelle 150 can pivot relative to inner tubular 131 (and tower 130) between the first position described above (nacelle 150 and the rotational axis 165 in a vertical orientation as shown in FIG. 8) and the second position described above (nacelle 150 and the rotational axis 165 in a horizontal orientation as shown in FIG. 3). Thus, in this embodiment, pivot joint 151 allows nacelle 150 (and rotor assembly 160 coupled thereto) to rotate through about 90° about a horizontal axis defined by joint 151. The pivoting of nacelle 150 is preferably performed and controlled by a powered pivoting system (not shown) coupled to nacelle 150 and inner tubular 131. For example, hydraulic cylinders or gears operated by electrical motors may be used to power the pivoting of nacelle 150. Such a pivoting system may be selectively installed to power the pivoting of nacelle 150 (e.g., during installation of wind turbine 100, during maintenance of nacelle 150 or rotor assembly 160, etc.) and then removed from wind turbine 100.

The lower end of each tubular 131, 132, 133 of tower 130 is open. In addition, each tubular 131, 132, 133 of tower 130 includes a plurality of uniformly circumferentially-spaced locking members 137. In this embodiment, locking members 137 of inner tubular 131 and intermediate tubular 132 are positioned proximal lower ends 131b, 132b, respectively, whereas locking members 137 of outer tubular 133 are positioned between ends 133a, 133b of outer tubular 133. FIGS. 5 and 6 illustrate the lower end 131b of inner tubular 131 and associated locking members 137, it being understood that the lower end of intermediate tubular 132 is the same. Locking members 137 of outer tubular 133 are also the same but are positioned above lower end 133b.

Locking members 137 are movably coupled to inner tubular 131 proximal to but axially spaced above lower end 131b. Each locking member 137 is moveably disposed in a corresponding recess 138 and is configured to move into and out of the corresponding recess 138. Locking members 137 and corresponding recesses 138 are disposed at the same axial position along inner tubular 131 proximal lower end 131b. In this embodiment, each locking member 137 is a wedge-shaped locking dog with an upper end 137a pivotally coupled to inner tubular 131 within the corresponding recess 138 and a lower end 137b that moves into and out of recess 138 as locking member 137 pivots about upper end 137a. Lower end 137b of each locking member 137 is biased radially outward relative to the corresponding recess 138. In general, locking members 137 can be biased outwardly by any suitable means known in the art such as springs. Thus, as shown in FIGS. 6 and 7, when there are no obstructions extending across recesses 138 along the radially outer surface of inner tubular 131, lower ends 137b are biased outward from recesses 138 and extend radially beyond the radially outer surface of inner tubular 131. However, when an obstruction extends across recesses 138 such as when locking members 137 of inner tubular 131 are disposed in intermediate tubular 132, locking members 137 are prevented from pivoting out about upper ends 137a from recesses 138.

Referring now to FIGS. 2, 5, and 8, elevator 140 has a central axis 145 coaxially aligned with axis 135, a first or upper end 140a disposed above upper end 110a of hull 110, and a second or lower end 140b (not visible in FIG. 2) disposed within receptacle 113 between upper end 110a and lower end 110b of hull 110. Elevator 140 is movably disposed within receptacle 113 of hull 110 such that it can be selectively rotated about axis 145 relative to hull 110 and selectively raised and lowered vertically (axially) relative to hull 110. In general, elevator 140 can be rotated about axis 145 by any suitable means known in the art. In this embodiment, one or more hydraulic jack(s) are used to rotate elevator 140 relative to hull 110 and the tubular 131, 132, 133 to be raised by elevator 140 as described in more detail below. The ends of each jack are coupled to connection members (e.g., eye pads) secured to elevator 140 and the tubular 131, 132, 133 about which the elevator 140 is to be rotated. In some embodiments, a pair of uniformly circumferentially-spaced jacks are provided. If the rotation angle is relative large, the rotation of the elevator 140 can be done in multiple steps. As will be described in more detail below, elevator 140 is selectively deballasted and ballasted to raise and lower, respectively, elevator 140.

As best shown in FIGS. 5 and 8, in this embodiment, elevator 140 includes a radially inner cylindrical tubular 142 extending between ends 140a, 140b and a radially outer cylindrical tubular 143 extending between ends 140a, 140b. Inner tubular 143 defines a central passage or cavity 144 extending axially from upper end 140a. Cavity 144 is open at upper end 140a and receives tower 130 therein. Thus, tower 130 can be held and stored within cavity 144 during transport and deployment of wind turbine 100, and then extended axially from cavity 144 during installation of wind turbine 100.

Tubulars 142, 143 are coaxially aligned with axis 145 with inner tubular 142 concentrically disposed within outer tubular 143. However, tubulars 142, 143 are radially spaced apart, thereby defining an annular chamber 146 radially positioned between tubulars 142, 143. Chamber 146 extends axially between ends 140a, 140b.

Chamber 146 is closed at upper end 140a and open at lower end 140b, thereby allowing water to flow freely into and out of chamber 146 when lower end 140b is disposed below the surface 13 of water 11. Chamber 146 can be controllably and selectively ballasted by removing air from chamber 146 (e.g., opening a valve proximal upper end 140a to allow air to escape) and allowing water to enter the inside of chamber 146 via lower end 140b, and controllably and selectively deballasted by pumping air into the inside of chamber 146 and forcing water to exit chamber 146 via lower end 140b. As will be described in more detail below, elevator 140 is deballasted and ballasted by increasing and decreasing, respectively, the volume of air in chamber 146 to move elevator axially up (via buoyancy) and down (via gravity/weight) to lift one or more tubulars 131, 132, 133 during erection and extension of tower 130.

Referring now to FIGS. 2, 4, and 5, a plurality of uniformly circumferentially-spaced catch members 136 are fixably mounted to upper end 131a, 132a, 133a of each tubular 131, 132, 133, respectively. Although catch members 136 are provided at upper end 133a of outer tubular 133 in this embodiment, in other embodiments, catch members 136 may be absent from the outermost tubular of the tower (e.g., outer tubular 133 of tower 130). In this embodiment, two catch members 136 angularly spaced 180° apart are provided on each tubular 131, 132, 133 of tower 130. The pair of catch members 136 of each tubular 131, 132, 133 are angularly and circumferentially-spaced in top view (FIG. 4) such that no two catch members 136 are circumferentially aligned in top view. In FIG. 5, catch members 136 are schematically shown as being angularly and circumferentially aligned solely to illustrate the relative radial extension of each pair of catch members 136, however, it should be appreciated that each pair of catch members 136 of tubulars 131, 132, 133 are angularly and circumferentially out of alignment.

Each catch member 136 extends radially outward from the corresponding tubular 131, 132, 133 at its upper end 131a, 132a, 133a, respectively. As shown in FIGS. 4 and 5, each catch member 136 extends radially outward to a radius (relative to axis 135) that is greater than the outer radius of outer tubular 133 but less than the inner radius of elevator 140 defined by inner tubular 142. Thus, in top view of FIG. 4, each catch member 136 extends radially into annulus 134 between tower 130 and elevator 140—catch members 136 of inner tubular 131 extend radially outward beyond intermediate tubular 132 and outer tubular 133 (but not to the radially inner surface of elevator 140), catch members 136 of intermediate tubular 132 extend radially beyond outer tubular 133 (but not to the radially inner surface of elevator 140), and catch members 136 extend radially over annulus 134 (but not to the radially inner surface of elevator 140). As best shown in FIGS. 2, 3, and 5, due to the sliding engagement and nested arrangement of tubulars 131, 132, 133, inner tubular 131 is positioned with upper end 131a and associated catch members 136 disposed vertically above upper end 132a of intermediate tubular 132, and intermediate tubular 132 is positioned with upper end 132a and associated catch members 136 disposed vertically above upper end 133a of outer tubular 133. In this embodiment, each catch member 136 comprises a pair of vertically oriented, circumferentially-spaced, parallel plates. However, in other embodiments, the catch members (e.g., catch members 136) may have other geometries and arrangements.

Referring still to FIGS. 4 and 5, a plurality of uniformly circumferentially-spaced catch members 147 are fixably mounted to upper end 140a of elevator 140. In this embodiment, two catch members 147 angularly spaced apart 180° apart are provided on elevator 140. Each catch member 147 extends radially inward from elevator 140 and inner tubular 142 at upper end 140a. In particular, each catch member 147 extends radially inward (relative to axis 145) to a radius that is less than the inner radius of inner tubular 142 but greater than the outer radius of outer tubular 133 of tower 130. Thus, each catch member 147 extends radially into annulus 134.

As will be described in more detail below, catch members 147 of elevator 140 are configured to releasably engage (e.g., axially abut) each pair of catch members 136 on tubulars 131, 132 of tower 130 to sequentially lift tubulars 131, 132 with elevator 140. For example, elevator 140 is rotated about axis 145 to circumferentially align catch members 147 of elevator 140 with catch members 136 of inner tubular 131, and then elevator 140 is raised (via deballasting chamber 146) to raise catch member 147 into engagement with catch members 136 of inner tubular 131 to lift inner tubular 131 with elevator 140 relative to tubulars 132, 133.

Referring now to FIGS. 10-13, options for deploying and installing wind turbine 100 is shown. More specifically, FIGS. 10 and 11 illustrates alternatives for deploying (e.g., transporting) wind turbine 100 to the installation site 10 in water 11; FIG. 12 illustrates the installation of wind turbine 100 at the installation site 10; and FIG. 13 illustrates the erection of tower 130 after the installation at installation site 10.

As previously described, the relative amounts of ballast water and air in columns 111 of hull 110 can be controllably adjusted to vary the buoyant force applied to hull 110, the relative amounts of ballast water and air in inner tubular 131 can be controllably adjusted to vary the buoyant force applied to inner tubular 131, and the relative amounts of ballast water and air in elevator 140 can be controllably adjusted to vary the buoyant force applied to elevator 140. Without being limited by this or any particular theory, if the total buoyant force applied to a structure (e.g., hull 110) is equal to or greater than the weight of that structure (and any other structures coupled thereto), then the structure will float, however, if the total buoyant force applied to the structure is less than the weight of the structure (and any other structure coupled thereto), then the structure will sink.

Referring now to FIGS. 10 and 11, in embodiments described herein, wind turbine 100 is fully assembled prior to deployment, and then deployed to the installation site 10. In other words, wind turbine 100 is transported to the installation site 10 in a fully assembled configuration (e.g., tower 130 coupled to hull 110, nacelle 150 coupled to tower 130, rotor assembly 160 coupled to nacelle 150, etc.), and thus, it is not necessary to assembly wind turbine 100 at the installation site 10, thereby eliminating the need to transport a crane or other construction equipment to the installation site 10. During deployment to installation site 10, tower 130 is fully retracted into elevator 140 and receptacle 113 of hull 110, thereby lowering the center of gravity of wind turbine 100, and nacelle 150 is in the vertical orientation to ensure blades 162 are positioned out of the water 11 and spaced above hull 110 (with tower 130 retracted and nacelle 150 positioned proximal upper end 110a of hull 110). In the embodiment shown in FIG. 10, wind turbine 100 is floated out to the installation site 10 (e.g., towed or pushed in the water to installation site via a tug or transport vessel 190). The buoyant force applied to wind turbine 100 is adjusted via columns 111 such that hull 110 and wind turbine 100 float (e.g., the buoyant force applied to wind turbine 100 exceeds the weight of wind turbine 100), and can then be towed to installation site 10 with transport vessel 190.

In the alternative embodiment shown in FIG. 11, one or more wind turbines 100 are loaded onto the deck of a heavy lift vessel 191, and then transported to installation site 10 on vessel 191. In general, each wind turbine 100 can be floated or lifted onto vessel 191 at the shipyard or nearshore, and then transported to installation site 10 on the deck of vessel 191. In general, float on procedures can be performed by ballasting vessel 191 to lower its deck sufficiently below the surface 13 of water 11 and de-ballasting wind turbine 100 such that it can be floated over the deck of vessel 191, and then de-ballasting (raising) vessel 191 and ballasting (lowering) wind turbine 100 to raise turbine 100 out of the water on the deck of vessel 191.

Moving now to FIG. 12, once wind turbine 100 is transported to the installation site 10, it is installed at the desired location at site 10. In particular, wind turbine 100 is floated over the desired installation location at site 10. When transported as shown in FIG. 10, vessel 190 can be used to position wind turbine 100 over the installation location. However, when transported as shown in FIG. 11, wind turbine 100 must first be floated off vessel 191. In such embodiments, vessel 191 is ballasted to lower its deck sufficiently below the surface 13 of water 11 to allow wind turbine 100 to be floated of vessel 191 and into the water 11. It should be appreciated that to float wind turbine 100 off vessel 191, the buoyant force applied to wind turbine 100 is adjusted via columns 111 such that hull 110 and wind turbine 100 float as wind turbine 100 is lowered into the water 11. Once wind turbine 100 is floating in water 11, vessel 191 or other vessel (not shown) can be used to position wind turbine over the desired installation location at site 10.

Referring still to FIG. 12, with wind turbine 100 positioned over the desired installation location at site 10, hull 110 is ballasted (e.g., columns 111 are flooded) to reduce the buoyant force applied to hull 110 below the weight of turbine 100 such that wind turbine 100 descends to the sea floor 12. As lower end 110b of hull 110 approaches the sea floor 12, suction skirts 114 penetrate the sea floor 12, thereby removably securing hull 110 and wind turbine 100 to the sea floor 12 at the desired installation location at site 10.

As shown in FIG. 12, tower 130 remains retracted and nacelle 150 remains in the vertical orientation as hull 110 is ballasted and secured to the sea floor 12. Depending on the depth of water 11 at the installation site 10 and the height $H_{110}$ of hull 110, nacelle 150 can be pivoted from the vertical orientation to the horizontal orientation before or after erecting tower 130. In general, nacelle 150 may be pivoted to the horizontal orientation as long as doing so would not cause blades 162 to engage hull 110 or penetrate the surface 13 of water 11.

Next, as shown in FIG. 13, once hull 110 is secured o the sea floor 12, tower 130 is erected. In this embodiment, tower 130 is erected by sequentially raising tubulars 131, 132, 133. More specifically, inner tubular 131 is deballasted to increase the buoyancy force acting on inner tubular 131. Inner tubular 131 may rise relative to hull 110, tubulars 132, 133, and elevator 140 if sufficient buoyant force can be generated by deballasting tubular 131. However, if deballasting inner tubular 131 does not result in inner tubular 131 rising to the desired height relative to hull 110 and tubulars 132, 133, elevator 140 can be employed to raise inner tubular 131 to the desired height. In particular, elevator 140 is rotated about axes 135, 145 to circumferentially and rotationally align catch members 147 with catch members 136 of inner tubular 131, and then elevator 140 is at least partially deballasted to lift elevator 140 and bring members 147 into engagement with members 136 of inner tubular 131. With members 136, 147 in engagement, elevator 140 is further deballasted to lift inner tubular 131 relative to intermediate tubular 132 and hull 110 until locking members 137 of inner tubular 131 clear upper end 132a of intermediate tubular 132. Once locking members 137 of inner tubular 131 clear upper end 132a of intermediate tubular 132, locking members 137 extend radially outward in response to the biasing force. Elevator 140 is then ballasted to lower elevator 140 relative to hull 110 and tubulars 132, 133, which remain in receptacle 113 as inner tubular 131 is raised, and elevator 140 is raised and then lowered. Inner tubular 131 descends with elevator 140 (with catch members 136, 147 engaged) until locking members 137 of inner tubular 131 axially abut upper end 132a of intermediate tubular 132, thereby preventing inner tubular 131 from continuing to descend with elevator 140. Elevator 140 continues to be lowered until upper end 140a is disposed below upper end 132a of intermediate tubular 132. With upper end 140a vertically below upper end 132a, upper end 132a of intermediate tubular 132 is accessible and is fixably attached to inner tubular 131 (e.g., via welding) to fixably securing tubulars 131, 132 with inner tubular 131 extending upward from intermediate tubular 132.

Referring still to FIG. 12, this process is generally repeated as shown in FIG. 12 to lift intermediate tubular 132. In particular, with inner tubular 131 extended and fixably attached to intermediate tubular 132, upper end 132a is effectively sealed and the assembly of tubulars 131, 132 is deballasted to increase the buoyancy force acting on tubulars 131, 132. The assembly of tubulars 131, 132 may rise relative to hull 110, outer tubular 133, and elevator 140 if sufficient buoyancy force can be generated by deballasting tubulars 131, 132. However, if tubulars 131, 132 do not rise to the desired height relative to hull 110 and outer tubular 133, elevator 140 can be employed to raise the assembly of tubulars 131, 132 to the desired height relative to hull 110. In particular, elevator 140 is rotated about axes 135, 145 to circumferentially and rotationally align catch members 147 with catch members 136 of intermediate tubular 132, and then and then elevator 140 is at least partially deballasted to lift elevator 140 and bring members 147 into engagement with members 136 of intermediate tubular 132. With members 136, 147 in engagement, elevator 140 is further deballasted to lift the assembly of tubulars 131, 132 relative to outer tubular 133 and hull 110 until locking members 137 of intermediate tubular 132 clear upper end 133a of outer tubular 133. Once locking members 137 of intermediate tubular 132 clear upper end 133a, locking members 137 extend radially outward in response to the biasing force. Elevator 140 is then ballasted to lower elevator 140 relative to hull 110 and tubular 133, which remain in receptacle 113 as tubulars 131, 132 are raised, and elevator 140 is raised and then lowered. The assembly of tubulars 131, 132 descends with elevator 140 (with catch members 136, 147 engaged) until locking members 137 of intermediate tubular 132 axially abut upper end 133a of outer tubular 133, thereby preventing the assembly of tubulars 131, 132 from continuing to descend with elevator 140. Elevator 140 is lowered until upper end 140a is disposed below upper end 133a of outer tubular 133. With upper end 140a vertically below upper end 133a, upper end 133a of outer tubular 133 is accessible and is fixably attached to intermediate tubular 132 (e.g., via welding), thereby fixably securing tubulars 131, 132, 133 with inner tubular 131 telescopically extending upward from intermediate tubular 132 and intermediate tubular 132 telescopically extending upward from outer tubular 133. To restrict relative movement between tower 130, elevator 140, and hull 110 while fixably attaching tubulars 131, 132 together and while fixably attaching tubular 133 to tubulars 131, 132, elevator 140 may be rotated to align catch members 147 with catch members 136 of outer tubular 133, and then deballasted to bring members 147 of elevator 140 into engagement with members 136 of outer tubular 133.

With tubulars 131, 132 extended and fixably attached to outer tubular 133, upper end 133a is effectively sealed and the assembly of tubulars 131, 132, 133 is deballasted to increase the buoyancy force acting on tubulars 131, 132, 133. In this embodiment, the internal volume of outer tubular 133 is sufficiently large to enable deballasting of outer tubular 133 to generate a sufficient buoyancy force to lift the assembly of tubulars 131, 132, 133 to the desired height relative to hull 110. Thus, in this embodiment, elevator 140 is not used to assist in the lifting of outer tubular 133 (and tubulars 131, 132 fixably attached to outer tubular 133).

Outer tubular 133 is deballasted to lift tubulars 131, 132, 133 relative to hull 110 and elevator 140 until locking members 137 of outer tubular 133 clear upper end 140a of elevator 140. It should be appreciated that locking members 137 of outer tubular 133 are positioned between ends 133a, 133b, and thus, deballasting of outer tubular 133 need not lift the entire assembly of tubulars 131, 132, 133 until lower end 133b of outer tubular 133 is proximal upper end 140a of elevator 140 to allow locking members 137 to extend radially outward above upper end 140a. Once locking members 137 of outer tubular 133 clear upper end 140a, locking members 137 extend radially outward. Outer tubular 133 is then ballasted to lower the assembly of tubulars 131, 132, 133 relative to hull 110 and elevator 140, which remains in receptacle 113 as the assembly of tubulars 131, 132, 133 is raised and lowered. The assembly of tubulars 131, 132, 133 descends until locking members 137 of outer tubular 133 axially abut upper end 140a of elevator 140, thereby preventing tubulars 131, 132, 133 from continuing to descend relative to hull 110 and elevator 140. Next, upper end 140a of elevator 140 is fixably attached to outer tubular 133 (e.g., via welding), thereby fixably securing tubulars 131, 132, 133 to elevator 140 with inner tubular 131 telescopically extending upward from intermediate tubular 132, intermediate tubular 132 telescopically extending upward from outer tubular 133, and outer tubular telescopically extending upward from elevator 140.

With tower 130 erected and fixably attached to elevator 140, elevator 140 is fixably attached to hull 110 (e.g., via welding, bolts, etc.) to fixably couple elevator 140 and erected tower 130 to hull 110. Although tower 130 includes three tubulars 131, 132, 133 in this embodiment, in other embodiments, the tower includes two, four or more tubulars that are erected in the same manner as previously described.

Once hull 110 is secured in position at installation site 10 and tower 130 is erected, nacelle 150 can be pivoted to the horizontal position if not previously done, thereby completing the installation of wind turbine 100. At that point, wind turbine 100 can be used to generate electricity.

Figure 14:
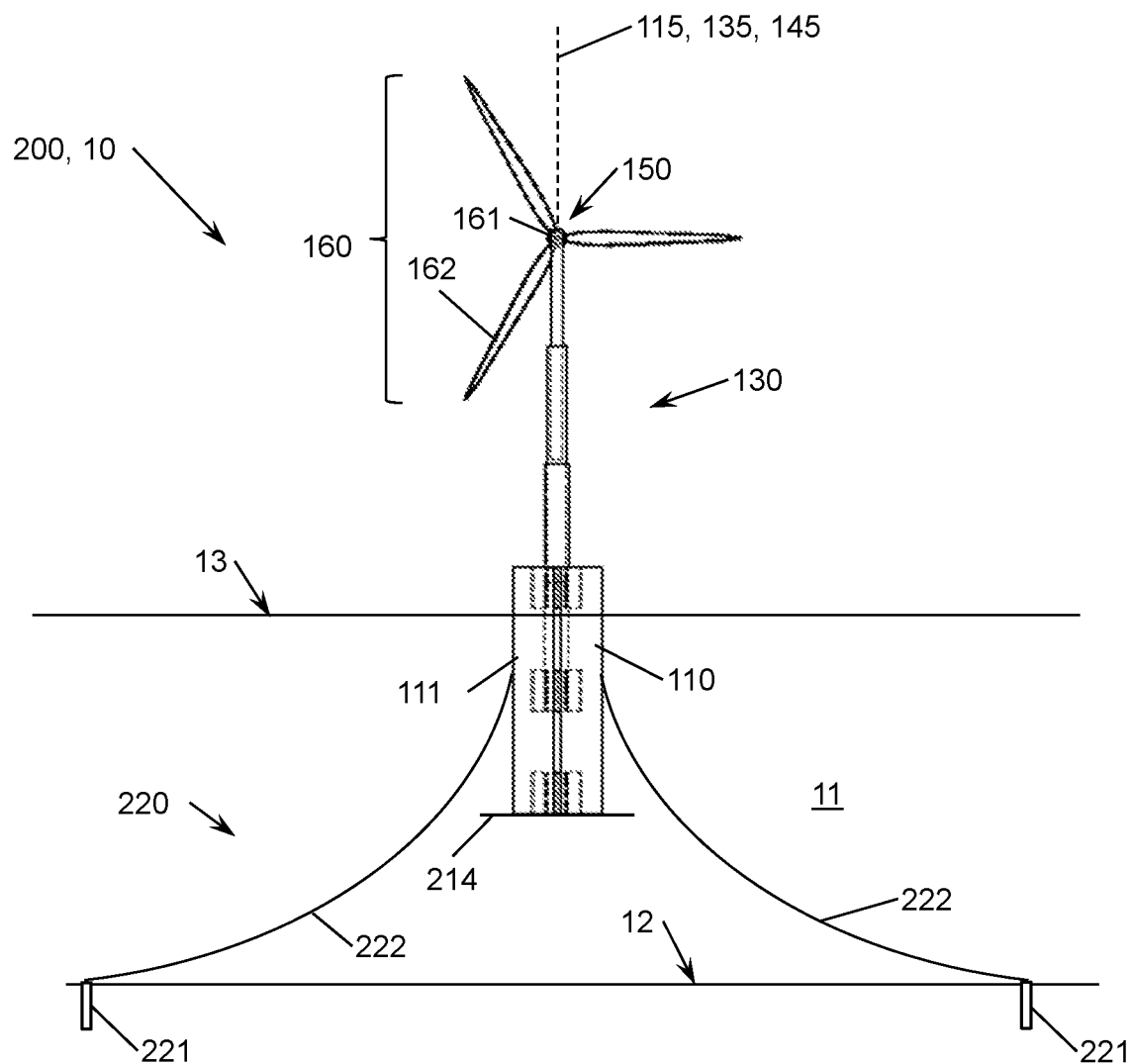
FIG. 14 is a front schematic view of an embodiment of an offshore wind turbine in accordance with the principles described herein.

As previously described and shown in FIGS. 1, 12, and 13, in the embodiment of offshore wind turbine 100 and methods for deploying and installing turbine 100 described above, wind turbine 100 is directly secured to the sea floor 12 via suction skirts 114. However, in other embodiments, the offshore wind turbine is not seated on the sea floor, but rather, floats at the installation site and is held in position with a mooring system. For example, referring now to FIG. 14, an embodiment of an offshore wind turbine 200 that is secured to the sea floor 12 at installation site 10 with a mooring system 220 while floating is shown. Wind turbine 200 is the same as wind turbine 100 previously described with the exception that skirts 114 are replaced with a hydrodynamic damper or heave plate 214 that is disposed at lower ends 111b of columns 111. Plate 214 is oriented perpendicular to axes 115, 135, 145 and extends laterally beyond the outer perimeter of hull 110. Mooring system 220 maintains the positon of floating turbine 200 at installation site 10. In this embodiment, mooring system includes a plurality of piles 221 secured to the sea floor 12 and mooring lines 222 extending from piles 221 to hull 110. Wind turbine 200 is deployed to the installation site in the same manner as previously described with respect to wind turbine 100 and shown in FIGS. 9 and 10. At the installation site 10, wind turbine 200 is floated over the desired installation location and hull 110 is ballasted (before or after disposed at the desired installation location) to lower the center of gravity of wind turbine 200. However, in this embodiment, wind turbine 200 is lowered into engagement with sea floor 12. Rather, wind turbine 200 is securely coupled to the sea floor 12 at the desired installation location at site 10 via mooring system 220.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. An offshore wind turbine, comprising:
    a ballast adjustable hull;
    a telescopic tower movably coupled to the hull, wherein the telescopic tower has a central axis and comprises a plurality of nested concentrically arranged elongate tubulars;
    a ballast adjustable elevator disposed about the telescopic tower and movably coupled to the hull, wherein the elevator is configured to lift one or more of the plurality of tubulars axially upward relative to the hull;
    a nacelle coupled to the telescopic tower; and
    a rotor assembly coupled to the nacelle;
    wherein the elevator includes a catch member at an upper end of the elevator and extending radially inward from the elevator into an annulus radially positioned between the elevator and the telescopic tower;
    wherein each tubular of the telescopic tower includes a catch member disposed at an upper end of the tubular and extending radially outward from the tubular into the annulus radially positioned between the elevator and the telescopic tower; and
    wherein the catch member of the elevator is configured to engage the catch member of each of the tubulars to sequentially raise the tubulars of the telescopic tower to erect the telescopic tower.

2. The offshore wind turbine of claim 1, wherein the hull comprises a plurality of circumferentially-spaced ballast adjustable columns disposed about the elevator.

3. The offshore wind turbine of claim 2, wherein each column includes a suction skirt that extends from a lower end of the column, wherein each of the suction skirts is configured to penetrate a sea floor to secure the wind turbine to the sea floor at an offshore installation site.

4. The offshore wind turbine of claim 1, wherein the nacelle is pivotably coupled to the telescopic tower, wherein the nacelle is configured to pivot at least 90° about a horizontal axis relative to the telescopic tower.

5. The offshore wind turbine of claim 1, wherein each of the tubulars of the telescopic tower comprises a recess proximal a lower end of the tubular and a locking member movably disposed in the recess.

6. The offshore wind turbine of claim 5, wherein each locking member is biased radially outward from the corresponding recess.

7. The offshore wind turbine of claim 6, wherein each locking member is configured to engage the upper end of a radially adjacent tubular of the telescopic tower or the upper end of the elevator.

8. A method for deploying and installing an offshore wind turbine, comprising:
 (a) transporting an offshore wind turbine to an offshore installation site, wherein the wind turbine includes:
  a ballast adjustable hull;
  a telescopic tower movably coupled to the hull and retracted into a receptacle of the hull, wherein the telescopic tower has a central axis and includes a first tubular, a second tubular movably disposed about the first tubular, and a third tubular movably disposed about the second tubular, wherein the first tubular, the second tubular, and the third tubular are nested and concentrically arranged;
  an elevator disposed about the telescopic tower and movably coupled to the hull;
  a nacelle coupled to the telescopic tower; and
  a rotor assembly coupled to the nacelle;
   wherein the elevator includes a catch member at an upper end of the elevator and extending radially inward from the elevator into an annulus radially positioned between the elevator and the telescopic tower;
   wherein each tubular of the telescopic tower includes a catch member disposed at an upper end of the tubular and extending radially outward from the tubular into the annulus radially positioned between the elevator and the telescopic tower;
   wherein the catch member of the elevator is configured to engage the catch member of each of the tubulars to sequentially raise the tubulars of the telescopic tower to erect the telescopic tower;
 (b) floating the wind turbine over a desired installation location after (a);
 (c) ballasting the hull to lower the wind turbine after (b);
 (d) coupling the hull to a sea floor after (c) to hold the wind turbine at the installation site;
 (e) erecting the telescopic tower after (d) by telescopically extending the telescopic tower from the receptacle of the hull by:
  (e1) engaging the catch member of the first tubular of the telescopic tower with the catch member of the elevator and raising the first tubular axially relative to the second tubular and the third tubular with the elevator;
  (e2) lowering the elevator relative to the first tubular, the second tubular, and the third tubular after (e1);
  (e3) fixedly securing the first tubular to the second tubular after (e2);
  (e4) engaging the catch member of the second tubular of the telescopic tower with the catch member of the elevator and raising the second tubular axially relative to the first tubular and the third tubular with the elevator after (e3);
  (e5) lowering the elevator relative to the first tubular, the second tubular, and the third tubular after (e4); and
  (e6) fixedly securing the second tubular to the third tubular after (e5).

9. The method of claim 8, wherein (e3) comprises locking the first tubular to the second tubular via at least one locking member to prevent the first tubular from moving downward relative to the second tubular.

10. The method of claim 8, wherein (d) comprises penetrating the sea floor with a plurality of suction skirts disposed at a lower end of the hull.

11. The method of claim 8, wherein the hull is floating after (c), (d), and (e); and
 wherein (d) comprises coupling the hull to the sea floor with a mooring system, wherein the mooring system includes a plurality of mooring lines extending from the hull to the sea floor.

12. The method of claim 8, wherein (a) comprises floating the wind turbine out to the installation site.

13. The method of claim 8, wherein (a) comprises transporting the wind turbine on a deck of a vessel.

14. The method of claim 13, wherein (b) comprises floating the wind turbine off the deck of the vessel.

15. The method of claim 8, further comprising pivoting the nacelle from a vertical orientation to a horizontal orientation after (a).

16. A method for erecting a telescopic tower of an offshore wind turbine, wherein the telescopic tower has a central axis and includes a first tubular, a second tubular movably disposed about the first tubular, and a third tubular movably disposed about the second tubular, wherein the first tubular, the second tubular, and the third tubular are nested and concentrically arranged, the method comprising:
 (a) engaging a catch member of the first tubular of the telescopic tower with a catch member of an elevator disposed about the telescopic tower and raising the first tubular axially relative to the second tubular and the third tubular with the elevator;
 (b) axially extending the first tubular from the second tubular and the third tubular during (a);
 (c) locking an axial position of the first tubular relative to the second tubular after (b);
 (d) lowering the elevator relative to the first tubular, the second tubular, and the third tubular after (c) with the first tubular axially locked relative to the second tubular;
 (e) engaging a catch member of the second tubular of the telescopic tower with the catch member of the elevator and raising the second tubular and the first tubular with the elevator after (d) with the first tubular axially locked relative to the second tubular;
 (f) axially extending the second tubular from the third tubular during (e);
 (g) locking an axial position of the first tubular and the second tubular relative to the third tubular after (f); and
 (h) lowering the elevator relative to the first tubular, the second tubular, and the third tubular after (g) with the first tubular and the second tubular axially locked relative to the third tubular.

17. The method of claim 16, wherein (a) comprises deballasting the elevator or deballasting the first tubular.

18. The method of claim 17, wherein the second tubular slidingly engages the first tubular and the third tubular.

19. The method of claim 16, wherein (e) comprises deballasting the elevator.

20. The method of claim 16, wherein (d) and (h) comprise ballasting the elevator.

21. The method of claim 16, further comprising:

welding an upper end of the second tubular to the first tubular after (d) and before (e); and welding an upper end of the third tubular to the second tubular after (h).

\* \* \* \* \*